United States Patent
Myer

[15] 3,676,685

[45] July 11, 1972

[54] LIGHT-RESPONSIVE SWITCHING CIRCUIT

[72] Inventor: Clifford E. Myer, Forest Grove, Oreg.

[73] Assignee: Xercon, Inc., Portland, Oreg.

[22] Filed: May 4, 1970

[21] Appl. No.: 34,430

Related U.S. Application Data

[63] Continuation-in-part of Ser. No. 6,055, Jan. 27, 1970, abandoned.

[52] U.S. Cl. ................................250/206, 307/311, 315/156

[51] Int. Cl. ........................................................H01j 39/12

[58] Field of Search .....................250/206; 315/156; 323/21; 307/311

[56] References Cited

UNITED STATES PATENTS 3,463,990 8/1969 Ross.....................................323/21 X
3,495,777 2/1970 Evalds et al............................307/311
3,450,939 6/1969 Misencik............................250/206 X

*Primary Examiner*—James W. Lawrence
*Assistant Examiner*—T. N. Grigsby
*Attorney*—Kolisch & Hartwell

[57] ABSTRACT

A modularized light-responsive switching circuit capable of use in relatively high power applications. The circuit includes a Triac connected as a switching element in series with a power source and a load. The gate electrode of the Triac is connected to a light-responsive gating circuit including a capacitor and at least one light-responsive resistor switchable between two resistance levels. The capacitor is charged when the light-responsive resistor assumes one resistance level and is discharged into the gate of the Triac when the light-dependent resistor assumes the other resistance level. The components of the switching circuit are encapsulated in a cylindrical module having a screen therein, through which the active surface of the light-responsive resistor can receive light, and having a pair of terminals to connect the module directly into a power circuit.

7 Claims, 4 Drawing Figures

INVENTOR.
CLIFFORD E. MYERS
BY Kolisch & Hartwell
ATTORNEYS

LIGHT-RESPONSIVE SWITCHING CIRCUIT

This is a continuation-in-part of U. S. application Ser. No. 6,055, filed Jan. 27, 1970 now abandoned.

BACKGROUND OF THE INVENTION

The present invention concerns a light-responsive Triac switching circuit adapted for use in relatively high power applications such as conventional 120 volt AC circuits. More particularly, the invention relates to an improved light-responsive switching circuit that utilizes small components characterized by low power and heat losses, and which is susceptible of packaging into a compact, modularized switching unit that can be conveniently connected directly into power circuits.

There is a need in manufacturing and process control operations for high speed switching units that can be connected directly into power circuits. Light-responsive switching circuits would be ideal for such purposes. However, light-responsive switching circuits known heretofore in the art for power applications have not been modularized for convenient installation and use in conjunction with process control apparatus.

Numerous switching circuits are known utilizing bidirectional semiconductors, such as Triacs, as switching elements in AC power circuits with current levels of five to six amps. It is well-known that a Triac may be gated or triggered from the blocking state to the conducting state by either polarity of gate signal with either polarity of voltage at the second anode, whereby full cycle operation in such AC circuits is permitted.

It has been suggested that a resistive circuit including a light-responsive element, such as a photocell, can be connected to the gate electrode of such a Triac for delivering a gating pulse to the Triac upon a predetermined change in the resistance of the photocell. However, the rated gate current necessary for switching a Triac is relatively high, i.e., about 50 milliamps. In order to develop a gate current of this magnitude in a purely resistive gating circuit supplied from a 120 volt line, the resistance of the circuit elements including the photocell must be kept relatively small, i.e., comprising less than 2,400 ohms of series resistance. Consequently, a photocell used in such an application is, by necessity, physically large and characterized by relatively high heat losses. Furthermore, because of the large physical size, for example up to one inch across, such low resistance photocells cannot be conveniently packaged in small, modularized units.

SUMMARY OF THE INVENTION

Accordingly, it is an object of the invention to provide an improved light-responsive switching circuit adapted for direct connection into an AC power circuit of relatively high current capacity.

It is another object of the invention to provide a circuit utilizing a Triac as a switching element, having a light-responsive gating circuit therefor which operates in one mode at a current below the rated gate current of the Triac, that is adapted to supply a gating pulse to the gate electrode of the Triac upon a predetermined change in resistance of the light-responsive element.

It is a further object of the invention to provide, in a switching circuit for a Triac connected in an AC power circuit, a relatively small light-responsive element and a capacitive element for applying a suitable gating pulse to the gate electrode of the Triac upon a predetermined change in the resistance of the light-responsive element.

It is a further object of the invention to provide a switching circuit utilizing components that are easily contained within a module adapted for connection directly into power circuits for control equipment, with the module having a screen for exposure of a light-responsive element utilized in the circuit.

These and other objects of the invention are attained by a circuit including a bidirectional semiconductor, such as a Triac, having first and second anodes connected in series between a power source and a load and having a gate electrode connected to a light-responsive gating circuit. The gating circuit includes a capacitor and a light-responsive element such as a photocell. In a first embodiment of the circuit, the capacitor is arranged to deliver a gating pulse to the Triac when the light-responsive element is exposed to a low light level. In a second embodiment of the circuit, the electrical connections of the light-responsive element and the capacitor are such that the Triac is switched to the conducting state when the light-responsive element is exposed to a high light level. In yet another embodiment of the circuit, a second light-responsive element is added to the gating circuit whereby fail-safe operation is attained. In each of the circuits, all the components are relatively small and can be encapsulated within a cylindrical module having a screen therein through which the active surface of the light-responsive element is exposed. The module is provided with a pair of terminals adapted for electrically connecting the switching circuit directly into a power circuit.

BRIEF DESCRIPTION OF THE DRAWINGS

Other objects and advantages of the invention will become apparent from the following detailed description taken in conjunction with the accompanying drawings wherein.

DETAILED DESCRIPTION OF THE INVENTION

Figure 1:
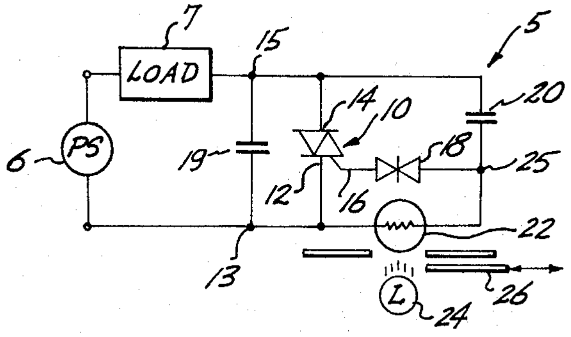
FIG. 1 is a schematic diagram of a light-responsive switching circuit designed in accordance with the invention.

Referring now to FIG. 1, a switching circuit 5 is shown connected between an AC power source 6 and a load 7. Although the circuit also functions at low power levels, it is envisioned that the power source deliver a conventional 120 volt AC voltage and that the load be process-control equipment having an average current requirement on the order of five or six amps.

A switching element, or device, 10 comprising a bidirectional triode semiconductor, commonly known as a Triac, is connected in series circuit with the power source and the load. The Triac has first and second anodes and a gate electrode and, as is well-known, is capable of withstanding the current levels mentioned above.

The first anode 12 of the Triac is connected to power supply 6 through terminal 13. The second anode 14 of the Triac is connected to the load through terminal 15, and gate electrode 16 of the Triac is connected to one electrode of a bidirectional avalanche diode 18. A capacitor 19 is connected to terminals 13 and 15 in electrical parallel with the Triac. The other electrode of diode 18 is connected to the common junction 25 of a capacitor 20 and a light-responsive element 22, such as a silicon or cadmium photocell or a phototransistor, for example. Capacitor 20 and light-responsive element 22 comprise a parts of a gating circuit, connected to terminals 13, 15 in electrical parallel with the Triac. Light-responsive element 22 has a high resistance value in the presence of low light levels, and a low resistance value in the presence of high light levels.

A lamp 24 is arranged near light-responsive element 22 for illumination thereof. The lamp is separated from the light-responsive element by a movable shutter 26 used to regulate the operation of the switching circuit.

In the embodiment of FIG. 1 a light-responsive element having a relatively high ratio of change in resistance to change in illumination is provided. To achieve reliable, fast operation it is envisioned that the low and high resistance levels of the light-responsive element will be established by a significant change in the illumination levels of the active surface of the element. For example, a light-responsive element having a resistance characteristic which varies from below 5,000 ohms to above 50,000 ohms in response to a change in illumination from above 25 footcandles to below five footcandles is preferred.

The impedance of capacitor 20, at the operating frequency, should approximate the resistance range of the light-responsive element in its high state and the impedance of capacitor 19 should also be relatively high.

In operation, with line voltage present and a high level of illumination reaching the active surface of the light-responsive element, the resistance of the light-responsive element is low. Due to the high impedance of capacitor 20, the average current through junction 25 is much lower than that required to gate the Triac. Also, since the voltage drop across the light-responsive element is small, the voltage at junction 25 is below the threshold value of diode 18 which, therefore, remains nonconductive.

Under the above conditions, capacitor 20 charges to a predetermined voltage level on the positive half cycles of alternating current conduction, and charges to a predetermined voltage level of opposite polarity on negative half cycles of alternating current conduction. Upon a change in illumination of the active surface of the light-responsive element to a low level, the resistance of element 22 increases rapidly to a high level. At that time, the voltage drop across the light-responsive element is also high, exceeding the threshold voltage of diode 18 and causing the diode to conduct. When diode 18 conducts, capacitor 20 immediately discharges through the diode into the gate of the Triac, gating the Triac into its unblocked or conductive state. The Triac remains in the conductive state until the resistance of the light-responsive element returns to its low level, and the voltage at junction 25 falls below the threshold voltage of diode 18. Capacitor 19 serves to offset inductive impedance in the load circuit and minimize interference of the circuit operation due to inductive voltage spikes. In addition, capacitor 19 acts as a commutating element when current is removed from the gate electrode of the Triac, resulting in sharp cutoff of conduction of the Triac.

It should be apparent that in the circuit described, satisfactory switching operation of a Triac is achieved with a current level in the gating circuit during one mode of operation that is significantly below the rated gate current of the Triac. Operation at the lower current level results in lower power losses and heat losses in the components of the gating circuit, and permits the use of a light-responsive element that is of small physical dimensions. The small light-responsive element is more easily packaged in a modularized unit described hereinafter.

The circuit described above may be used to advantage in a variety of applications. For example, the current capacity of the circuit is sufficient that it may be used with either resistive or inductive load elements such as motor contacts, as well as with switch contacts for valve control, or to energize a numerical counter. Accordingly, the shutter may be arranged to move in response to the transportation of packages along a conveyor, in response to fluid pressure sensing means, or in response to a variety of other parameters which it might be desired to monitor during process control operations.

Figure 2:
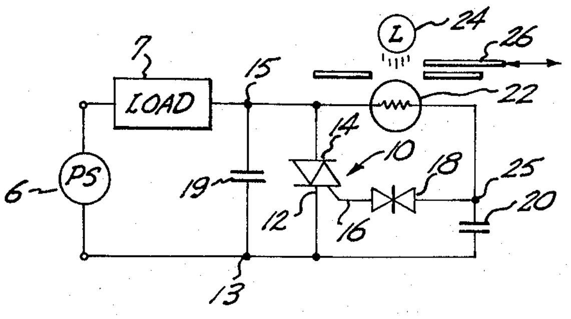
FIG. 2 is a schematic diagram of an alternative switching circuit.

Referring now to FIG. 2, an alternative circuit is illustrated wherein like elements are designated by like numerals. In the circuit of FIG. 2, the positions of light-responsive element 22 and capacitor 20 are reversed whereby the light-responsive element is connected between the second anode and the gate electrode of the Triac. In the presence of a low light level, the resistance of the light-responsive element is high and most of the line voltage is dropped across element 22. Consequently, diode 18 is nonconductive in that condition. However, in the presence of a high light level, the resistance of light-responsive element 22 is low and the voltage at junction 25 is sufficiently high to initiate conduction of diode 18. In that event capacitor 20 discharges, delivering a gating pulse to the gate electrode of the Triac. Accordingly, the operation of the circuit is such that a high level of illumination of the light-responsive element initiates conduction of the Triac.

Figure 3:
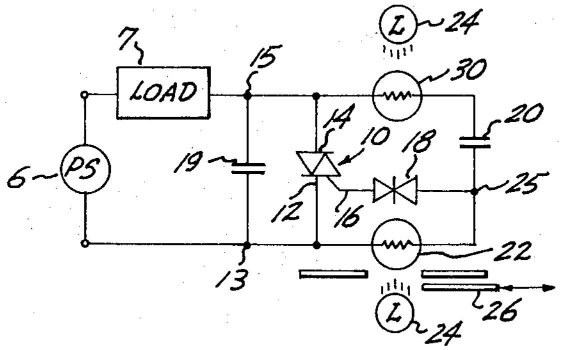
FIG. 3 is a schematic diagram of another alternative switching circuit which is adapted to be fail-safe.

Another alternative circuit is shown in FIG. 3, wherein like elements are again designated by like numerals. The circuit of FIG. 3 is similar to that of FIG. 1, with the exception that another light-responsive element 30 has been added. Element 30 is connected between the second anode of the Triac and capacitor 20, and is positioned so that it is constantly illuminated by lamp 24. If element 22 is intermittently screened from the lamp, the circuit operates just as the circuit of FIG. 1. However, should lamp 24 fail, the resistances of both element 22 and element 30 will assume a high level. In that event, diode 18 will remain nonconductive and the Triac will remain in a blocked state. Consequently, the circuit is protected against failure of lamp 24.

Figure 4:
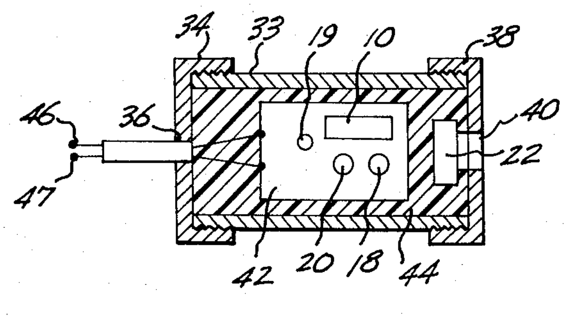
FIG. 4 is a top view, in section, of a module in which switching circuits of the type illustrated in FIGS. 1–3 can be encapsulated.

Referring now to FIG. 4, a cylinder 33 is shown having threaded opposite ends. A cap 34 having an opening 36 formed therein is screwed on one end of the cylinder while a cap 38, having an opening 40 formed therein, is screwed on the other end of the cylinder. The components of a switching circuit, such as that shown in FIG. 1, are confined within the cylinder upon a terminal board 42 in conventional fashion and are encapsulated by a suitable insulating material 44. As shown, the light-responsive surface of element 22 is exposed through opening 40 whereby the active surface of the light-responsive element receives light from an exterior source, not shown. Leads 46, 47 extend from terminals on the terminal board through opening 36 in cap 34 for convenient connection to other electrical circuitry. The encapsulated module described herein is durable and unusually shock-resistant when placed in service. Likewise, the electrical circuit is self-contained and sufficiently compact that the switching module may be easily used in conjunction with process control equipment for manufacturing operations. The small physical dimensions of the light-responsive element and its characteristic low heat losses, when embodied in the circuit described, contribute to the compact design of the module.

It is claimed and desired to secure by Letters Patent:

1. An electrical switching circuit comprising
- a bidirectional switching device having a gate and a pair of anodes adapted to be connected in closed electrical circuit with an AC power source and a load, and
- gating circuit means for said device including a bidirectional avalanche diode having one side connected to said gate, a capacitor and a first light-responsive element connected in series between the other side of said diode and one of said anodes, and a second light-responsive element connected between said other side of said diode and the other anode.

2. The circuit of claim 1, wherein said capacitor is connected between said light-responsive elements.

3. An electrical switching circuit adapted to be connected in series with an AC power source and a load for supplying and blocking the flow of such power to the load comprising
- a pair of terminals with one adapted to be connected directly to one side of a load and the other adapted to be connected directly to one side of a source,
- a bidirectional switching device having a gate and a pair of anodes, each of said anodes being connected directly to a different one of said terminals,
- a capacitor directly interconnecting said terminals and in parallel with said device, and
- gating circuit means for said device including a bidirectional avalanche diode having one side connected directly to said gate, a capacitor different from said first-mentioned capacitor directly interconnecting the other side of said diode and one of said anodes, and at least one light-responsive element directly interconnecting said other side of said diode and the other anode.

4. The circuit of claim 3, wherein said one anode is the anode adapted to be connected to said one side of said load.

5. The circuit of claim 4, wherein said switching device comprises a Triac.

6. The circuit of claim 3, wherein said one anode is the anode adapted to be connected to said one side of said source.

7. The circuit of claim 6, wherein said switching device comprises a Triac.

* * * * *

UNITED STATES PATENT OFFICE
CERTIFICATE OF CORRECTION

Patent No. 3,676,685 Dated July 11, 1972

Inventor(s) Clifford E. Myers

It is certified that error appears in the above-identified patent and that said Letters Patent are hereby corrected as shown below:

On the cover sheet [72] the inventor's name should read -- Clifford E. Myers --.

Signed and sealed this 20th day of March 1973.

(SEAL)
Attest:

EDWARD M.FLETCHER,JR.
Attesting Officer

ROBERT GOTTSCHALK
Commissioner of Patents